Oct. 10, 1933.  R. D. GIBSON ET AL  1,930,267
TESTING AND ADJUSTING DEVICE
Filed Dec. 20, 1930
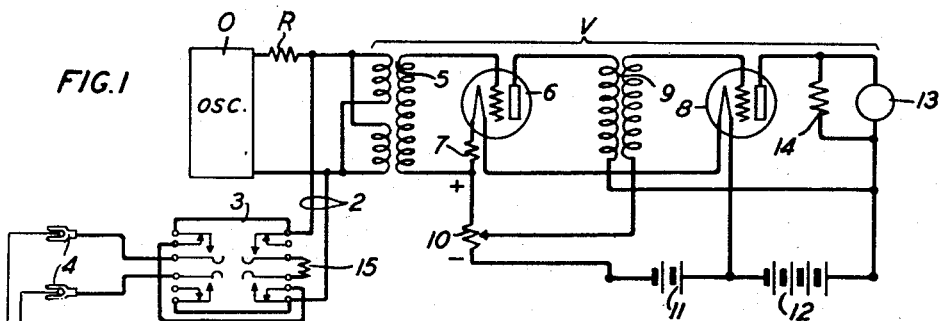
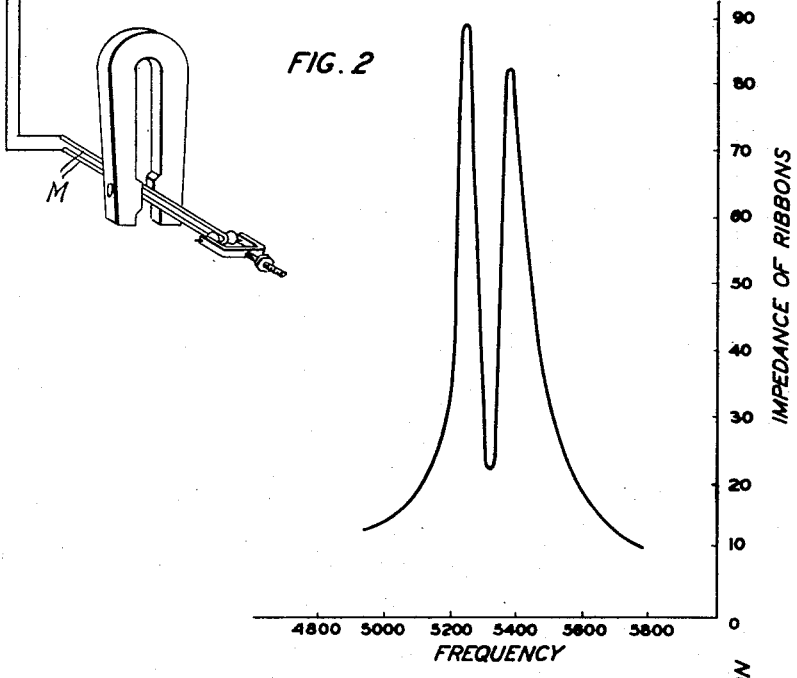
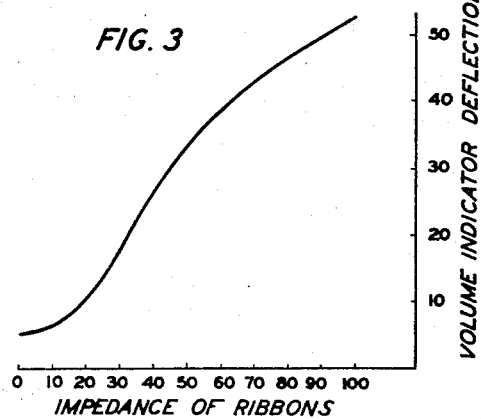
INVENTORS R.D.GIBSON
J.B.HARLEY
BY G.H.Heydt
ATTORNEY Patented Oct. 10, 1933

1,930,267

UNITED STATES PATENT OFFICE 1,930,267

TESTING AND ADJUSTING DEVICE

Robert D. Gibson, Rahway, N. J., and John B. Harley, New York, N. Y., assignors to Bell Telephone Laboratories, Incorporated, New York, N. Y., a corporation of New York Application December 20, 1930
Serial No. 503,754

6 Claims. (Cl. 179—100.1)

This invention relates to sound picture systems and more particularly to an improved method of and system for adjusting translating devices such as light valves used in the recording of sound.

It is an object of this invention to provide a method of and system for accurately adjusting and preparing light valves for operation.

A feature of the invention lies in the provision of a system wherein a change in the electrical impedance of the filaments as they approach mechanical resonance is made use of to give an indication that the filaments are approaching resonance with the frequency of the impressed voltage supplied by a variable frequency oscillator.

The principle of operation of such a light valve is disclosed in U. S. Patent 1,638,555 to E. C. Wente. A pair of electrical conductors or filaments, which are arranged in a plane at right angles to a magnetic field so as to define a transmitting slot, are supplied with sound modulated currents to cause them to move relative to each other thus varying the width of the slot and the amount of light transmitted.

In operation, resonance effects in the filament of the valve cause distortion in the sound record. If some of the component frequencies of the original sound impressed on the filaments correspond to the natural period of vibration of the filament, they will resonate, thereby causing non-uniform response to the applied sound currents. This natural period of vibration of the filaments can be regulated by increasing or decreasing the tension applied thereto. It is always desirable to have the natural period of vibration of the filaments above any frequencies which are liable to be applied to the valve during operation, thereby insuring uniform response throughout the recording range. As the filaments are extremely delicate they are apt to break if too great a tension is applied thereto. For this reason it is necessary to have some method for accurately determining the frequency of mechanical resonance of the filaments for a certain applied tension. The operation of adjusting the tension of the filaments and determining at what frequency they resonate for the applied tension is termed "tuning" the translating device.

In accordance with one embodiment of this invention voltages of increasing frequency are applied in successive steps to the filaments of a translating device and the increase in motional electrical impedance of the filaments as they near mechanical resonance is made use of to give an indication on a voltmeter that the frequency of the impressed voltage is approaching the frequency of mechanical resonance of the filaments. More specifically the filaments of the valve are connected in shunt to the output of a variable frequency oscillator and the input of a volume indicator circuit is connected directly across the light valve filaments. Voltages of increasing frequencies are impressed, in successive steps, to the filaments by means of the variable frequency oscillator. The filaments, forming a shunt arm in the circuit, will vibrate as a voltage from the oscillator is impressed thereon. Although the impedance of the filaments at rest is small, being only the D. C. resistance, their movement or vibration caused by the frequency of the impressed voltage will cause them to generate a back E. M. F. which counteracts the input voltage, thereby increasing their impedance and allowing less current to flow in the shunt circuit. The maximum impedance will be reached when the filaments reach their natural period of vibration. This action is made use of by means of a voltmeter connected directly across the filaments, to indicate at what applied frequency maximum impedance and consequent resonance occurs for a certain applied tension.

In another embodiment of the invention a voltage of the maximum frequency at which it is desired to adjust the valve is impressed on the filaments and the tension is increased in successive steps until a reading is obtained on a voltmeter which denotes that the filaments have been tensioned sufficiently to have a frequency of mechanical resonance corresponding to the frequency of the applied voltage and therefore maximum motional impedance in the circuit.

The invention may be more clearly understood by reference to the accompanying drawing in which:

Fig. 1 discloses the complete light valve tuning circuit including a variable oscillator and a two-stage amplifier and volume indicator.

Fig. 2 is a curve showing the effect of increase of applied frequency on the impedance of the light valve ribbons in preliminary tuning.

Fig. 3 is a curve showing the change in deflection of the volume indicator with a change in the motional impedance of the ribbon of the light valve.

In Fig. 1 the output circuit of a vacuum tube oscillator O is connected to the input of a two-stage volume indicator circuit V. The light valve ribbons M are connected across the output circuit of the oscillator through conductors 2, switch 3 and clips 4. A resistance R is connected in series with the output of the oscillator. The resistance R, being preferably high compared to the D. C. resistance of the ribbons, magnifies the effect of a change of impedance of the ribbons on a primary winding of a transformer 5 forming the input transformer of the volume indicator circuit V. The secondary winding of the transformer 5 is connected across the input electrode of amplifier 6. The connection to the cathode is through resistance 7, which provides a suitable bias for the grid of the device. Amplifier 6 is inductively coupled to a second amplifier 8 through a transformer 9. The grid of the amplifier 8 is suitably biased by a variable connection to a resistance 10 in the filament circuit. The filaments of the two amplifying tubes are in series, and are heated by a battery 11. Plate voltage is supplied to the two plates in parallel from a battery 12. Connected in the output circuit of the amplifier 8 is a meter 13. A resistance 14 is shunted across the meter 13 to damp the oscillations of the meter needle and provide for a steady reading.

The switch 3 when thrown to the right-hand position connects the leads 2 to a known resistance 15 for the purpose of calibrating before operation. The value of the resistance 15 is equal to the maximum motional electrical impedance of the ribbon of a light valve, this value having been previously determined from the average of a number of such light valves tested. This value of resistance was determined by employing a variable resistance, whose value was known for each setting, in the place occupied by resistance 15 in the circuit of Fig. 1. An output voltage from the oscillator was then impressed on this resistance and the meter 13 calibrated in terms of resistance. Thereafter, a plurality of light valves were tested separately in this circuit. In each case the movable elements of the valve were made to vibrate at their frequency of mechanical resonance and the value of resistance noted by the meter scale at such point of mechanical resonance. The average of the values of resistance at mechanical resonance of the movable elements of all the valves tested was then computed. This computed average value is taken as the value of resistance 15 employed for calibration. The curve shown in Fig. 3 was obtained in the above operation of calibrating the meter 13 in terms of resistance. Each setting of the variable resistance mentioned above was plotted against the volume indicator reading of the meter.

In obtaining this specific curve a fixed resistance R of a known value (in this case 200 ohms) was employed and the gain of the amplifier adjusted to allow a maximum throw of the meter needle within the meter scale for a certain applied oscillator voltage. Having determined the average maximum resistance of the movable elements of light valves at mechanical resonance, the corresponding meter reading at this value of resistance and therefore the meter reading for mechanical resonance of a valve may be determined before operation by reference to Fig. 3, presuming the same values of R and oscillator voltage are used in operation as were used in obtaining this curve.

In accordance with this invention the tuning operation proceeds as follows: The movable elements or ribbons of the valve are connected to the switch 3 by clips 4. The switch is first thrown to the right-hand position to connect resistance 15 across the output of the oscillator. This value of resistance 15 is taken to equal 90 ohms which is the average maximum motional electrical impedance of the ribbons of a valve at mechanical resonance as determined in the test previously discussed. The output of the particular oscillator to be used is then impressed on this resistance and the output voltage regulated to give a meter reading corresponding to the reading for 90 ohms in Fig. 3. This arrangement allows oscillators of slightly varying characteristics to be used and also compensates for local variation in line voltage.

The switch 3 is then thrown to the left-hand position to connect the ribbons of the valve across the output circuit of the oscillator. The oscillator has thereon a scale denoting the different values of frequency impressed on the output circuit for each setting of this scale. The ribbons of the valve are usually given a small original tension before tuning. The oscillator output voltage of increasing frequency, is then impressed, in successive steps, to the ribbons of the valve. As the movement or mechanical vibration of the ribbons is increased the motional electrical impedance of the shunt circuit is increased, thereby causing more current to flow in the volume indicator circuit. The maximum motional electrical impedance is reached when the ribbons vibrate at their frequency of mechanical resonance for the tension originally applied. The tension is then increased in steps and the oscillator output voltage of increasing frequency in successive steps applied for each step in the tension increase until a maximum reading on the meter is obtained for the impressed frequency at which it is desired to adjust the movable elements of the valve.

In accordance with another embodiment of this invention a voltage of the frequency at which it is desired to adjust the valve may be immediately (after calibration) impressed on the ribbons and their tension increased until a maximum reading on the meter is obtained.

The curve in Fig. 2 shows two peaks or frequencies at which the ribbons reach mechanical resonance and the electrical impedance of the ribbons at each point of mechanical resonance. The two different resonant points are caused by imperfect equalization of the tension of the ribbons. The fact that two such points are obtained in the preliminary tuning gives to this invention an advantage over other systems heretofore employed. It discloses imperfect equalization of tension, an imperfection which can be readily remedied by retensioning the ribbons until equal tension is applied to both. The occurrence of two distinct peaks, as obtained in this system in preliminary tuning, enables the operator to obtain more accurate tuning of both ribbons to the same frequency which is not possible in systems employed heretofore.

It is obvious from the above description that the frequency of mechanical resonance of the vibrating system of a translating device may be accurately determined by this method of determining at what frequency of mechanical vibration the motional electrical impedance of such vibrating system is a maximum.

What is claimed is:

1. In a translating device having a tensioned movable element responsive to electrical currents, the mechanical vibration of which for a certain applied frequency value indicates its adjustment, a method of determining the adjustment of said element, which comprises determining the frequency of mechanical vibration at which the motional electrical impedance of said element is a maximum.

2. In a translating device having a tensioned movable element responsive to electrical currents, a method of adjusting said movable element, which comprises impressing on said element a voltage of predetermined frequency to cause it to vibrate, applying a tension to said element and noting by electrical means the applied tension at which the motional electrical impedance of said element is a maximum.

3. In an electro-dynamic system having tensioned movable elements responsive to electrical currents, a method of determining the frequency of mechanical resonance of said movable elements which comprises applying to said elements in successive steps a voltage of increased frequency at each step, and determining by electrical means the applied frequency at which the motional impedance of said elements is a maximum.

4. In a translating device having means for producing a magnetic field and tensioned movable elements suspended in said field, a method of tuning said elements which comprises applying thereto a voltage of a known frequency, and tensioning said elements until their motional electrical impedance becomes a maximum as determined by appropriate electrical means.

5. The method of adjusting the movable elements of a translating device to resonate at a predetermined frequency, which comprises tensioning said elements, applying to said elements in successive steps a voltage of increased frequency at each step until the motional electrical impedance of said elements is a maximum, and thereafter increasing the tension of said elements in successive steps, and repeating the application of a voltage of increased frequency in successive steps for each of said successively increased tension steps until the motional electrical impedance of said elements is a maximum at said predetermined applied frequency.

6. In a light valve having means for producing a constant magnetic field and tensioned movable elements suspended in said field, a method of tuning said elements to resonate at a predetermined frequency which comprises applying to said elements a voltage of the predetermined frequency, and increasing the tension applied to said elements in successive steps until their motional electrical impedance becomes a maximum as determined by appropriate electrical means.

ROBERT D. GIBSON.
JOHN B. HARLEY.